(12) United States Patent
Forutanpour et al.

(10) Patent No.: US 11,462,868 B2
(45) Date of Patent: Oct. 4, 2022

(54) CONNECTOR CARRIER FOR ELECTRONIC DEVICE KIOSK

(71) Applicant: ecoATM, LLC, San Diego, CA (US)

(72) Inventors: Babak Forutanpour, San Diego, CA (US); Jeffrey Ploetner, San Diego, CA (US); Robert O'Neil, San Diego, CA (US); Neil Vesco, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 370 days.

(21) Appl. No.: 16/788,153

(22) Filed: Feb. 11, 2020

(65) Prior Publication Data

US 2020/0259300 A1 Aug. 13, 2020

Related U.S. Application Data

(60) Provisional application No. 62/804,714, filed on Feb. 12, 2019.

(51) Int. Cl.
| | | |
|---|---|---|
| *H01R 24/38* | (2011.01) | |
| *B60P 3/025* | (2006.01) | |
| *H01R 27/00* | (2006.01) | |
| *H02J 7/00* | (2006.01) | |
| *G06Q 20/32* | (2012.01) | |

(52) U.S. Cl.
CPC ............ *H01R 24/38* (2013.01); *B60P 3/0257* (2013.01); *H01R 27/00* (2013.01); *H02J 7/0044* (2013.01); *G06Q 20/322* (2013.01)

(58) Field of Classification Search
CPC ....... H01R 24/38; H01R 27/00; B60P 3/0257; G06Q 20/322
See application file for complete search history.

(56) References Cited

U.S. PATENT DOCUMENTS

| | | |
|---|---|---|
| 3,808,439 A | 4/1974 | Renius |
| 4,248,334 A | 2/1981 | Hanley et al. |
| 4,519,522 A | 5/1985 | McElwee |
| 4,593,820 A | 6/1986 | Antonie |

(Continued)

FOREIGN PATENT DOCUMENTS

| | | |
|---|---|---|
| CA | 2760863 | 11/2010 |
| CA | 2818533 A1 | 5/2012 |

(Continued)

OTHER PUBLICATIONS

U.S. Appl. No. 16/952,340, filed Nov. 20, 2020, Unpublished.

(Continued)

*Primary Examiner* — Harshad C Patel
(74) *Attorney, Agent, or Firm* — Perkins Coie LLP

(57) ABSTRACT

Connector carriers (e.g., connector carousels) for use with electronic device processing kiosks, such as mobile phone recycling kiosks, are disclosed herein. In some embodiments, a connector carrier includes a chassis and a plurality of electrical connectors fixedly positioned around a periphery of the chassis. In operation, the connector carrier is configured to rotate about a central axis to position a selected one of the electrical connectors in a first position adjacent to an inspection area of the kiosk, and then move toward the (Continued)

inspection area to move the selected electrical connector from the first position to a second position in which a user can connect a mobile phone to the electrical connector.

20 Claims, 8 Drawing Sheets

(56) References Cited

U.S. PATENT DOCUMENTS

| | | | |
|---|---|---|---|
| 4,715,709 A | 12/1987 | Sekine et al. | |
| 4,821,118 A | 4/1989 | Lafreniere | |
| 4,845,636 A | 7/1989 | Walker | |
| 4,870,357 A | 9/1989 | Young et al. | |
| 4,878,736 A | 11/1989 | Hekker et al. | |
| 4,893,789 A | 1/1990 | Novorsky | |
| 4,927,051 A | 5/1990 | Falk et al. | |
| 4,951,308 A | 8/1990 | Bishop et al. | |
| 5,025,344 A | 6/1991 | Maly et al. | |
| 5,027,074 A | 6/1991 | Haferstat | |
| 5,077,462 A | 12/1991 | Newell et al. | |
| 5,091,773 A | 2/1992 | Fouche et al. | |
| 5,105,149 A | 4/1992 | Tokura | |
| 5,216,502 A | 6/1993 | Katz | |
| 5,280,170 A | 1/1994 | Baldwin | |
| 5,319,459 A | 6/1994 | Mochizuki et al. | |
| 5,339,096 A | 8/1994 | Beaufort et al. | |
| 5,419,438 A | 5/1995 | Squyres et al. | |
| 5,436,554 A | 7/1995 | Decker | |
| 5,570,920 A | 11/1996 | Crisman et al. | |
| 5,572,444 A | 11/1996 | Lentz et al. | |
| 5,610,710 A | 3/1997 | Canfield et al. | |
| 5,717,780 A | 2/1998 | Mitsumune et al. | |
| 5,747,784 A | 5/1998 | Walter et al. | |
| 5,748,084 A | 5/1998 | Isikoff | |
| 5,775,806 A | 7/1998 | Allred | |
| 5,839,058 A | 11/1998 | Phillips et al. | |
| 5,871,371 A * | 2/1999 | Rothenberger | H01R 12/75 |
| | | | 439/579 |
| 5,920,338 A | 7/1999 | Katz | |
| 5,949,901 A | 9/1999 | Nichani et al. | |
| 5,965,858 A | 10/1999 | Suzuki et al. | |
| 5,966,654 A | 10/1999 | Croughwell et al. | |
| 5,987,159 A | 11/1999 | Nichani | |
| 5,988,431 A | 11/1999 | Roe | |
| 6,029,851 A | 2/2000 | Jenkins et al. | |
| 6,041,229 A | 3/2000 | Turner | |
| 6,055,512 A | 4/2000 | Dean et al. | |
| 6,100,986 A | 8/2000 | Rydningen | |
| 6,170,702 B1 | 1/2001 | Zettler et al. | |
| 6,181,805 B1 | 1/2001 | Koike et al. | |
| 6,228,008 B1 | 5/2001 | Pollington et al. | |
| 6,234,812 B1 * | 5/2001 | Ivers | H01R 25/006 |
| | | | 439/378 |
| 6,259,827 B1 | 7/2001 | Nichani | |
| 6,264,104 B1 | 7/2001 | Jenkins et al. | |
| 6,330,354 B1 | 12/2001 | Companion et al. | |
| 6,330,958 B1 | 12/2001 | Ruskin et al. | |
| 6,393,095 B1 | 5/2002 | Robinson | |
| 6,462,644 B1 | 10/2002 | Howell et al. | |
| 6,529,837 B1 | 3/2003 | Kang | |
| 6,535,637 B1 | 3/2003 | Wootton et al. | |
| 6,573,886 B1 | 6/2003 | Lehtinen et al. | |
| 6,587,581 B1 | 7/2003 | Matsuyama et al. | |
| 6,595,684 B1 | 7/2003 | Casagrande et al. | |
| 6,597,552 B1 | 7/2003 | Griepentrog et al. | |
| 6,633,377 B1 | 10/2003 | Weiss et al. | |
| 6,667,800 B1 | 12/2003 | Larsson et al. | |
| 6,748,296 B2 | 6/2004 | Banerjee et al. | |
| 6,754,637 B1 | 6/2004 | Stenz | |
| 6,758,370 B2 | 7/2004 | Cooke et al. | |
| 6,798,528 B1 | 9/2004 | Hartman | |
| 6,822,422 B2 | 11/2004 | Sagawa | |
| 6,842,596 B2 | 1/2005 | Morii et al. | |
| 6,854,656 B2 | 2/2005 | Matsumori | |
| 6,947,941 B1 | 9/2005 | Koon | |
| D512,964 S * | 12/2005 | Kissinger | G07F 9/001 |
| | | | D13/139.4 |
| 7,069,236 B1 | 6/2006 | Tsunenari | |
| 7,076,449 B2 | 7/2006 | Tsunenari et al. | |
| 7,086,592 B2 | 8/2006 | Wagner et al. | |
| 7,178,720 B1 | 2/2007 | Strubbe et al. | |
| 7,234,609 B2 | 6/2007 | DeLazzer et al. | |
| 7,251,458 B2 | 7/2007 | O'Connell | |
| 7,268,345 B2 | 9/2007 | Schultz | |
| 7,334,729 B2 | 2/2008 | Brewington | |
| 7,407,392 B2 * | 8/2008 | Cooke | H02G 3/185 |
| | | | 108/62 |
| 7,408,674 B2 | 8/2008 | Moro et al. | |
| 7,455,226 B1 | 11/2008 | Hammond et al. | |
| 7,520,666 B2 | 4/2009 | Pevzner et al. | |
| 7,529,687 B1 | 5/2009 | Phan | |
| 7,567,344 B2 | 7/2009 | LeBlanc et al. | |
| 7,642,687 B2 * | 1/2010 | Kageyama | H02K 23/38 |
| | | | 439/507 |
| 7,646,193 B2 | 1/2010 | Suzuki et al. | |
| 7,649,450 B2 | 1/2010 | Campion et al. | |
| 7,702,108 B2 | 4/2010 | Amon et al. | |
| 7,735,125 B1 | 6/2010 | Alvarez et al. | |
| 7,761,331 B2 | 7/2010 | Low et al. | |
| 7,783,379 B2 | 8/2010 | Beane et al. | |
| 7,848,833 B2 | 12/2010 | Li | |
| 7,881,965 B2 | 2/2011 | Bowles et al. | |
| 7,890,373 B2 | 2/2011 | Junger | |
| D640,199 S * | 6/2011 | Wilson | H01R 31/02 |
| | | | D13/139.7 |
| 8,010,402 B1 | 8/2011 | Sharma et al. | |
| 8,019,588 B1 | 9/2011 | Wohlberg et al. | |
| 8,025,229 B2 | 9/2011 | Hammond et al. | |
| 8,031,930 B2 | 10/2011 | Wang et al. | |
| 8,107,243 B2 | 1/2012 | Guccione et al. | |
| 8,112,325 B2 | 2/2012 | Foy et al. | |
| 8,142,199 B1 * | 3/2012 | Almouli | H01R 31/02 |
| | | | 439/640 |
| 8,195,511 B2 | 6/2012 | Bowles et al. | |
| 8,200,533 B2 | 6/2012 | Librizzi et al. | |
| 8,200,736 B2 | 6/2012 | Shi | |
| 8,215,546 B2 | 7/2012 | Lin et al. | |
| 8,239,262 B2 | 8/2012 | Bowles et al. | |
| 8,254,883 B2 | 8/2012 | Uchida | |
| 8,266,008 B1 | 9/2012 | Siegel et al. | |
| 8,340,815 B2 | 12/2012 | Peters et al. | |
| 8,369,987 B2 | 2/2013 | Claessen | |
| 8,423,404 B2 | 4/2013 | Bowles et al. | |
| 8,429,021 B2 | 4/2013 | Kraft et al. | |
| 8,463,646 B2 | 6/2013 | Bowles | |
| 8,536,472 B2 * | 9/2013 | Wu | H01H 25/008 |
| | | | 345/184 |
| 8,543,358 B2 | 9/2013 | Trabona | |
| 8,566,183 B1 | 10/2013 | Bonar et al. | |
| 8,606,633 B2 | 12/2013 | Tarbert et al. | |
| 8,718,717 B2 | 5/2014 | Vaknin et al. | |
| 8,755,783 B2 | 6/2014 | Brahami et al. | |
| 8,806,280 B2 | 8/2014 | Stephenson | |
| 8,823,794 B2 | 9/2014 | Suzuki et al. | |
| 8,824,136 B1 | 9/2014 | Interian et al. | |
| 8,743,215 B1 | 11/2014 | Lee | |
| 8,922,643 B2 | 12/2014 | Ji et al. | |
| 9,010,627 B1 | 4/2015 | Prasad et al. | |
| 9,043,026 B2 | 5/2015 | Lien et al. | |
| 9,124,056 B1 * | 9/2015 | Lewis, Jr. | H02G 3/0493 |
| 9,189,911 B2 | 11/2015 | Kavli et al. | |
| 9,195,979 B2 | 11/2015 | Geller | |
| 9,256,863 B2 | 2/2016 | Chayon et al. | |
| 9,317,989 B2 | 4/2016 | Grow et al. | |
| 9,355,515 B2 | 5/2016 | Brahami et al. | |
| 9,367,982 B2 | 6/2016 | Chayun et al. | |
| 9,378,606 B2 | 6/2016 | Chayun et al. | |
| 9,390,442 B2 | 7/2016 | Lyle | |
| 9,582,101 B2 | 2/2017 | Chang et al. | |
| 9,595,238 B2 | 3/2017 | Won | |
| 9,621,947 B1 | 4/2017 | Oztaskent | |
| 9,641,997 B2 | 5/2017 | Vratskides | |
| 9,697,548 B1 | 7/2017 | Jaff et al. | |

(56) References Cited

U.S. PATENT DOCUMENTS

| | | |
|---|---|---|
| 9,704,142 B2 | 7/2017 | Ahn |
| 9,818,160 B2 | 11/2017 | Bowles et al. |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 10,032,140 B2 | 7/2018 | Bowles et al. |
| 10,043,339 B2 | 8/2018 | Walker et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,572,946 B2 | 2/2020 | Bowles et al. |
| 10,657,591 B1 | 5/2020 | Chen et al. |
| 10,679,279 B2 | 6/2020 | Ward |
| 10,824,942 B1 | 11/2020 | Bhotika et al. |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 11,010,841 B2 | 5/2021 | Bowles et al. |
| 11,024,111 B2 | 6/2021 | Abdelmalak et al. |
| 11,080,662 B2 | 8/2021 | Bowles et al. |
| 11,080,672 B2 | 8/2021 | Bowles |
| 11,107,046 B2 | 8/2021 | Bowles |
| 11,126,973 B2 | 9/2021 | Silva et al. |
| 11,232,412 B2 | 1/2022 | Hunt et al. |
| 11,315,093 B2 | 4/2022 | Bowles |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Treia |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Weij et al. |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2007/0012665 A1 | 1/2007 | Nelson |
| 2007/0013124 A1 | 1/2007 | Graef et al. |
| 2007/0032098 A1 | 2/2007 | Bowles et al. |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0160668 A1 | 6/2009 | Crowley et al. |
| 2009/0177319 A1 | 7/2009 | Garibaldi et al. |
| 2009/0184865 A1 | 7/2009 | Vale et al. |
| 2009/0187491 A1 | 7/2009 | Bull et al. |
| 2009/0190142 A1 | 7/2009 | Taylor et al. |

(56) References Cited

U.S. PATENT DOCUMENTS

| | | |
|---|---|---|
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0235812 A1 | 9/2012 | Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0157641 A1 | 6/2013 | Brahami et al. |
| 2013/0159119 A1 | 6/2013 | Henderson et al. |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0038556 A1 | 2/2014 | DeSousa |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0170237 A1 | 6/2015 | Powell |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0309912 A1 | 10/2015 | Nguyen et al. |
| 2015/0120485 A1 | 11/2015 | Nash |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0087381 A1 | 3/2016 | Wong et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0210648 A1 | 7/2016 | Cirannek et al. |
| 2016/0269401 A1 | 9/2016 | Saito et al. |
| 2016/0275460 A1 | 9/2016 | Ploetner et al. |
| 2016/0275518 A1 | 9/2016 | Bowles et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0115235 A1 | 4/2017 | Ohlsson et al. |
| 2017/0169401 A1 | 6/2017 | Beane et al. |
| 2017/0256119 A1 | 9/2017 | Abdelmalak et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0372273 A1 | 12/2017 | Bowles et al. |
| 2018/0084094 A1 | 3/2018 | Sinha et al. |
| 2018/0157820 A1 | 6/2018 | Adams et al. |
| 2018/0260794 A1 | 9/2018 | Bowles et al. |
| 2018/0293566 A1 | 10/2018 | Engles et al. |
| 2018/0321163 A1 | 11/2018 | Casadio |
| 2018/0322623 A1 | 11/2018 | Memo et al. |
| 2019/0019147 A1 | 1/2019 | McCarty et al. |
| 2019/0066439 A1 | 2/2019 | Pinkus |
| 2019/0166278 A1 | 5/2019 | Hiyama et al. |
| 2019/0222748 A1* | 7/2019 | Weir ............... H04N 13/117 |
| 2019/0251777 A1 | 8/2019 | Abdelmalak et al. |
| 2019/0279431 A1 | 9/2019 | Wurmfeld et al. |
| 2019/0287141 A1 | 9/2019 | Bordeleau et al. |
| 2019/0318465 A1 | 10/2019 | Nguyen |
| 2020/0020097 A1 | 1/2020 | Do et al. |
| 2020/0090137 A1 | 3/2020 | Bowles et al. |
| 2020/0151677 A1 | 5/2020 | Bowles et al. |
| 2020/0167748 A1 | 5/2020 | Dion et al. |
| 2020/0175669 A1 | 6/2020 | Bian et al. |
| 2020/0202319 A1 | 6/2020 | Forutanpour et al. |
| 2020/0241891 A1 | 7/2020 | Li et al. |
| 2020/0258343 A1 | 8/2020 | Forutanpour et al. |
| 2020/0265487 A1 | 8/2020 | Forutanpour et al. |
| 2020/0393742 A1 | 12/2020 | Dion et al. |

(56) References Cited

U.S. PATENT DOCUMENTS

| | | |
|---|---|---|
| 2021/0012315 A1 | 1/2021 | Priebatsch |
| 2021/0035206 A1 | 2/2021 | Bowles et al. |
| 2021/0081914 A1 | 3/2021 | Nelms et al. |
| 2021/0110440 A1 | 4/2021 | Dion et al. |
| 2021/0174312 A1 | 6/2021 | Bowles et al. |
| 2021/0192484 A1* | 6/2021 | Forutanpour ....... G07F 17/0014 |
| 2021/0254966 A1 | 8/2021 | Hur et al. |
| 2021/0295494 A1 | 9/2021 | Forutanpour et al. |
| 2022/0027879 A1 | 1/2022 | Bowles et al. |
| 2022/0051212 A1 | 2/2022 | Forutanpour et al. |
| 2022/0051300 A1 | 2/2022 | Forutanpour et al. |
| 2022/0051301 A1* | 2/2022 | Forutanpour ........... G07F 9/001 |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1* | 4/2022 | Forutanpour ........... G07F 9/001 |
| 2022/0172178 A1 | 6/2022 | Forutanpour et al. |
| 2022/0198407 A1 | 6/2022 | Beane et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 202351953 | 7/2012 |
| CN | 202394296 | 8/2012 |
| CN | 102654927 | 9/2012 |
| CN | 102682597 A | 9/2012 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 205132514 U | 4/2016 |
| CN | 106372638 A | 2/2017 |
| CN | 206440635 U | 8/2017 |
| CN | 206466691 U | 9/2017 |
| CN | 207037788 U | 2/2018 |
| CN | 105444678 B | 3/2018 |
| CN | 108596658 A | 9/2018 |
| CN | 108764236 A | 11/2018 |
| CN | 208819255 U | 5/2019 |
| CN | 208819289 U | 5/2019 |
| CN | 208819290 U | 5/2019 |
| CN | 208969761 U | 6/2019 |
| CN | 111009073 A | 4/2020 |
| CN | 210666955 U | 6/2020 |
| CN | 211149556 U | 7/2020 |
| CN | 111099242 B | 9/2021 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2017093938 | 6/2017 |
| JP | 2019012474 | 1/2019 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101329949 | 11/2013 |
| KR | 20140037543 | 3/2014 |
| KR | 1020180086617 | 8/2018 |
| KR | 20190026131 | 3/2019 |
| KR | 1020190107594 | 9/2019 |
| KR | 1020200115308 | 10/2020 |
| KR | 20210020717 | 2/2021 |
| KR | 1020210059148 | 5/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |

(56) References Cited

FOREIGN PATENT DOCUMENTS

| | | |
|---|---|---|
| WO | WO2004021114 | 3/2004 |
| WO | WO2004114490 | 12/2004 |
| WO | WO2005008566 | 1/2005 |
| WO | WO2005101346 | 10/2005 |
| WO | WO2006058601 | 6/2006 |
| WO | WO2006080851 | 8/2006 |
| WO | WO2007066166 | 6/2007 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019212513 | 11/2019 |
| WO | WO2019212515 | 11/2019 |
| WO | WO2020082991 | 4/2020 |
| WO | WO2020204503 | 10/2020 |
| WO | WO2021019286 | 2/2021 |
| WO | WO2021082923 | 5/2021 |
| WO | WO2021142009 | 7/2021 |
| WO | WO2021147385 | 7/2021 |
| WO | WO2021147386 | 7/2021 |
| WO | WO2021147387 | 7/2021 |

OTHER PUBLICATIONS

2006 Florida Statutes Title XXXIII, Chapter 538, Sections 538.03 and 538.04, 7 pages.
3GPP Organizational Partners, "3rd Generation Partnership Project; Technical Specification Group Terminals; AT command set for GSM Mobile Equipment (ME)," Global System for Mobile Communications, 1998, 124 pages.
Aftermarket Cellular Accessories, "Cellular Phone Model Identification," retrieved from http://web/archive.org/web/20060328064957/ http://aftermarketcellular.com/ic/identifi cation.html on Marchi 6, 2014, published Mar. 28, 2006, 3 pages.
Altec Lansing User's Guide 2007, 8 pages.
Bhule et al., "Environmental and economic trade-offs in consumer electronic products recycling: a case study of cell phones and computers," IEEE International Symposium on Electronics and the Environment, Conference Record, 2004.
Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.
Business Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-LCD-burn-ins-and-deadstuck-pixels/.
Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008,1 page.
Cybercom Group, "Leading Telecom Organisations Address Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. Vol. 18(4): 493-504.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=LCD on Apr. 28, 2016, 1 page.
International Numbering Plan, www.numberingplans.com, 2 pages.
International Search Report and Written Opinion dated Jun. 3, 2020 in International Application No. PCT/US2020/017766, 10 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (2006, Jan. 19) US Fed News Service, Including US State News. Web. Jan. 6, 2015, 1 page.
mobilegazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference KEUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2 015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, p. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route To Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.

(56) References Cited

OTHER PUBLICATIONS

Shotton et al., "Efficiently Combining Contour and Texture Cues for Object Recognition", Proceedings of the British Machine Vision Conference 2008, (Sep. 1, 2008), p. 7.1-7.10 * abstract*.

Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.

Simplysellular, "Get Cash for your Old Cell Phone", published Apr. 2, 2010, Yetrieved from http://simplysellular.com/conditions.php on Jan. 6, 2015, 2 pages.

Sony Ericsson Mobile Communications AB, "P800/P802," White Paper, 2003, 128 pages.

Sony Ericsson Mobile Communications AB, "T68i/T68ie," White Paper, 2002, 71 pages.

Tecace Software: "Your phone appraisal-Movaluate—Android Apps on Google Play", Android Apps On Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.

Trading devices for dollars, The Economist (US) 405.8813:8 (US), Economist Intelligence Unit N.A. Incorporated, Dec. 1, 2012.

Turner, "5 MP3 Players for Pumping Up Your Workouts," Mashable.com, Nov. 4, 2010, available online at https://mashable.com/2010/11/04/mp3-players-for-sports/ (Year: 2010).

Waugh, "Phone recycling machine lets you drop in old mobiles - and spits out cash instantly," Daily Mail Online, Jan. 13, 2012, p. 1-2.

Wikipedia, "Machine Vision" Sep. 19, 2009, 6 pages.

Wiley Encyclopedia of Computer Science and Technology (2009).

Wilson, Doug, "Liquid Crystal Display (LCD) Inspection System", National Instruments Case Study, available May 10, 2009, retrieved from http://sine.ni.eom/cs/app/cod/p/id/cs-345 on Jan. 5, 2015, 2 pages.

Wu, "Overview of Wireless Power and Data Communication" WPC/QI Developers Forum, Oct. 29, 2016, 21 pages.

Yahoo Answers, "What is a Clean ESN?" published Jun. 23, 2009, retrieved from http://web.archive.Org/web/20090623215042/http://answers.yahoo.com/question/inde,8020US?qid=20080318061012AANFRco on April 3, 2014.

Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.

International Search Report and Written Opinion dated Jun. 4, 2020 in International Application No. PCT/US2020/017770, 30 pages.

* cited by examiner

CONNECTOR CARRIER FOR ELECTRONIC DEVICE KIOSK

CROSS-REFERENCE TO RELATED APPLICATION INCORPORATED BY REFERENCE

The present application claims priority to and the benefit of U.S. Provisional Application No. 62/804,714, titled CONNECTOR CARRIER FOR ELECTRONIC DEVICE KIOSK, which was filed on Feb. 12, 2019, and is incorporated herein by reference in its entirety.

TECHNICAL FIELD

The present disclosure is generally related to kiosks for buying and/or selling mobile phones and/or other electronic devices and, more particularly, to connector carriers for use with such kiosks.

BACKGROUND

There are more mobile phones in use now than there are people on the planet. The rapid growth of mobile phones is due in part on the rapid pace at which these devices evolve. Because of the rapid pace of development, a relatively high percentage of mobile phones are replaced every year as consumers continually upgrade to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones are simply tossed into junk drawers or otherwise kept until a suitable disposal solution arises.

Although many mobile phone retailers and cell carrier stores now offer mobile phone trade-in or buyback programs, many old phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can recycle and/or sell their used mobile phones using self-service kiosks located in malls, retail stores, or other publicly accessible areas. Such kiosks are operated by ecoATM, LLC, the assignee of the present application, and aspects of these kiosks are described in, for example: U.S. Pat. Nos. 7,881,965, 8,195,511, 8,200,533, 8,239,262, 8,423,404 and 8,463,646; U.S. Provisional Patent Application Nos. 62/169,072, 62/202,330, 62/332,736, 62/782,302 and 62/782,947; and U.S. patent application Ser. Nos. 14/498,763, 14/500,739, 14/506,449, 14/568,051, 14/598, 469, 14/660,768, 14/663,331, 14/873,145, 14/873,158, 14/925,357, 14/925,375, 14/934,134, 14/964,963, 14/967, 183, 14/966,346, 15/057,707, 15/130,851, 15/176,975 and 16/719,699, each of which is incorporated herein by reference in its entirety.

Mobile phone recycling kiosks typically provide users with a connector for connecting to the device they wish to sell so that the kiosk can electronically evaluate the device for identification, functionality, etc. Because different makes and models of mobile devices often require different connectors, the kiosk will generally include at least one of each type of commonly-found connector so that the kiosk can accommodate a broad range of commercially available devices. Each of the connectors is typically attached to an individual electrical cable that is carried on a rotating carrousel or other type of carrier device. To use a connector, the user pulls the connector and cable away from the carrier device and manually connects the connector to their device. As a result of repeated pulling and handling by users, the cables have a tendency to break or otherwise become damaged over time, requiring time-consuming replacement and contributing to kiosk down-time. Accordingly, it would be advantageous to provide a connector carrying device for use with mobile device recycling kiosks that is less susceptible to connector and/or cable damage from use, and thus requires less maintenance and has a longer service life than conventional connector carrying devices.

DETAILED DESCRIPTION

Figures 1A, 1B:
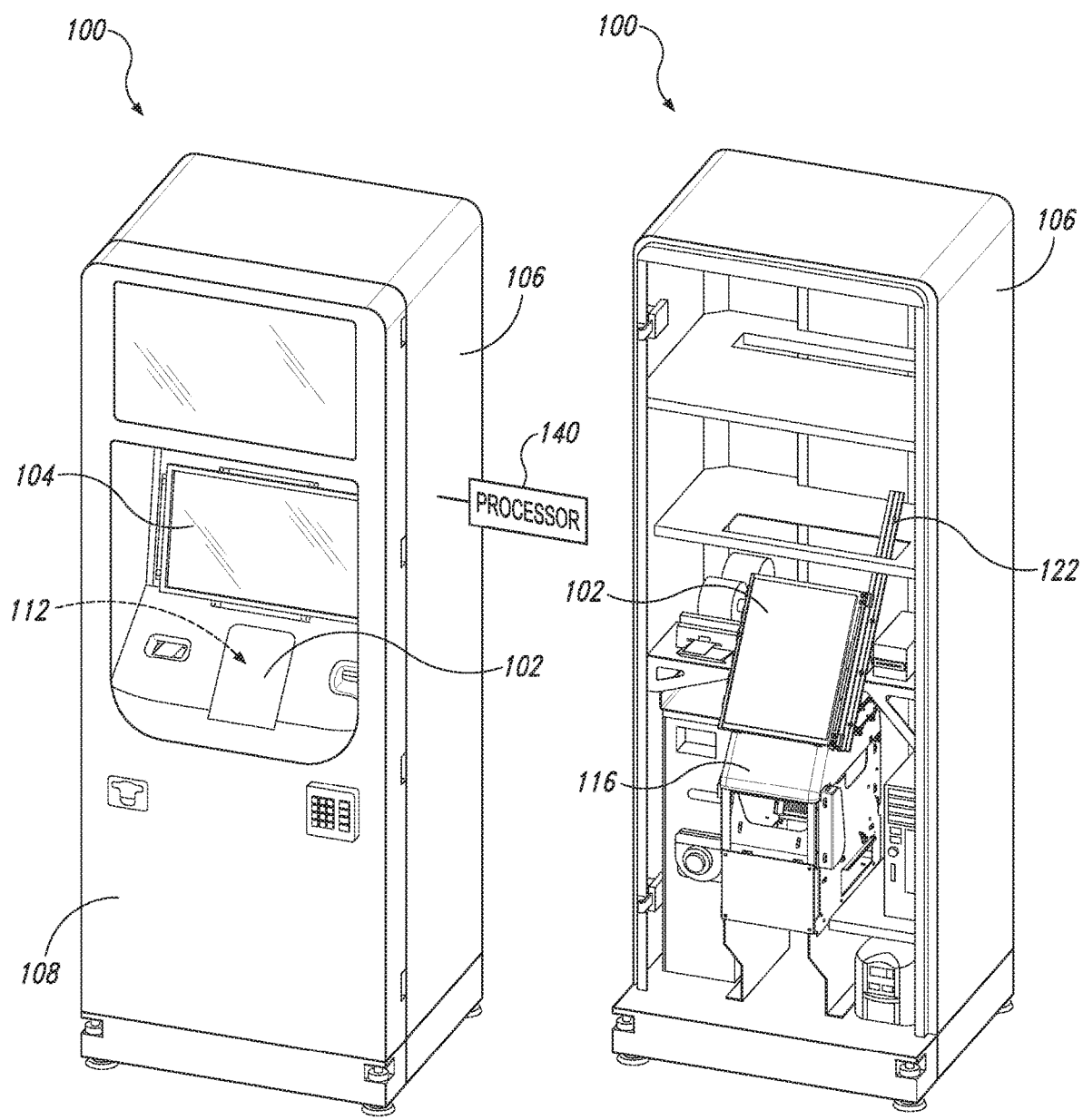
FIG. 1A is a front isometric view of an electronic device recycling kiosk configured in accordance with embodiments of the present technology.
FIG. 1B is a front isometric view of the kiosk with a front door and associated hardware omitted for purposes of better illustrating internal components and systems of the kiosk.

The following disclosure describes various embodiments of connector carriers for use with kiosks, such as consumer-operated kiosks for purchasing mobile phones and/or other handheld electronic devices from consumers, and/or for selling mobile phones and/or other mobile electronic devices to consumers. In some embodiments, connector carriers configured in accordance with the present technology can include rotatable carousels that carry a plurality of different mobile phone connectors around a periphery thereof. In contrast to conventional connector carriers in which the connectors and the associated cables are manually extracted from the carrier for manual connection to a mobile device, in the connector carriers of the present technology the connectors remain stationary relative to the carrier and are not manually extracted for connection to mobile devices. Instead, as described in greater detail below, the connector carriers of the present technology are movable as a unit to present the correct connector to the user so that the user can dock their mobile device to the connector. After the electrical inspection, the kiosk automatically disconnects the connector from the mobile device. As a result, the connectors and associated cables are not subjected to repeated pulling and other rough handling that can lead to premature wear and tear. Accordingly, use of connector carriers configured in accordance with the present technology can lead to longer connector/cable service life, reduced maintenance and greater kiosk up-time.

Certain details are set forth in the following description and in FIGS. 1A-3B to provide a thorough understanding of various embodiments of the present technology. In other instances, well-known structures, materials, operations and/or systems often associated with mobile electronic devices, mobile device recycling kiosks, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1A is a partially schematic front isometric view of a kiosk 100 configured in accordance with embodiments of the present technology for purchasing electronic devices (e.g., mobile phones) from consumers. FIG. 1B is a front isometric view of the kiosk 100 with a front door 108 removed from a housing 106 to better illustrate selected internal components of the kiosk 100. Referring to FIGS. 1A and 1B together, in some embodiments the kiosk 100 can include a number of user interface devices to facilitate use of the kiosk 100. For example, in the illustrated embodiment the kiosk 100 includes a display 104 (e.g., an LCD screen) that can provide textual and/or graphical information to users to facilitate a phone purchasing process. The display 104 can include touch-screen capability for receiving user inputs in response to displayed prompts, etc. Additionally, in some embodiments the kiosk 100 can also include a keypad, an ID card reader, a thumbprint scanner, a cash dispenser, a receipt printer, and/or other user interface devices to facilitate the phone purchase process. The kiosk 100 further includes an access door 102 that covers an internal device inspection area 112. As shown in FIG. 1B, the door 102 can be slidably coupled to an inclined track 122 so that the door 102 can move upwardly to provide a user with access to the inspection area 112. The kiosk 100 also includes a suitable processor 140 that controls operation of the kiosk components and systems as described herein in accordance with computer-readable instructions stored on system memory. The processor 140 may be any logic processing unit, such as one or more CPUs, digital signal processors (DSPs), application-specific integrated circuits (ASICs), etc. The processor 140 may be a single processing unit or multiple processing units in the kiosk or distributed across multiple devices.

Figure 1C:
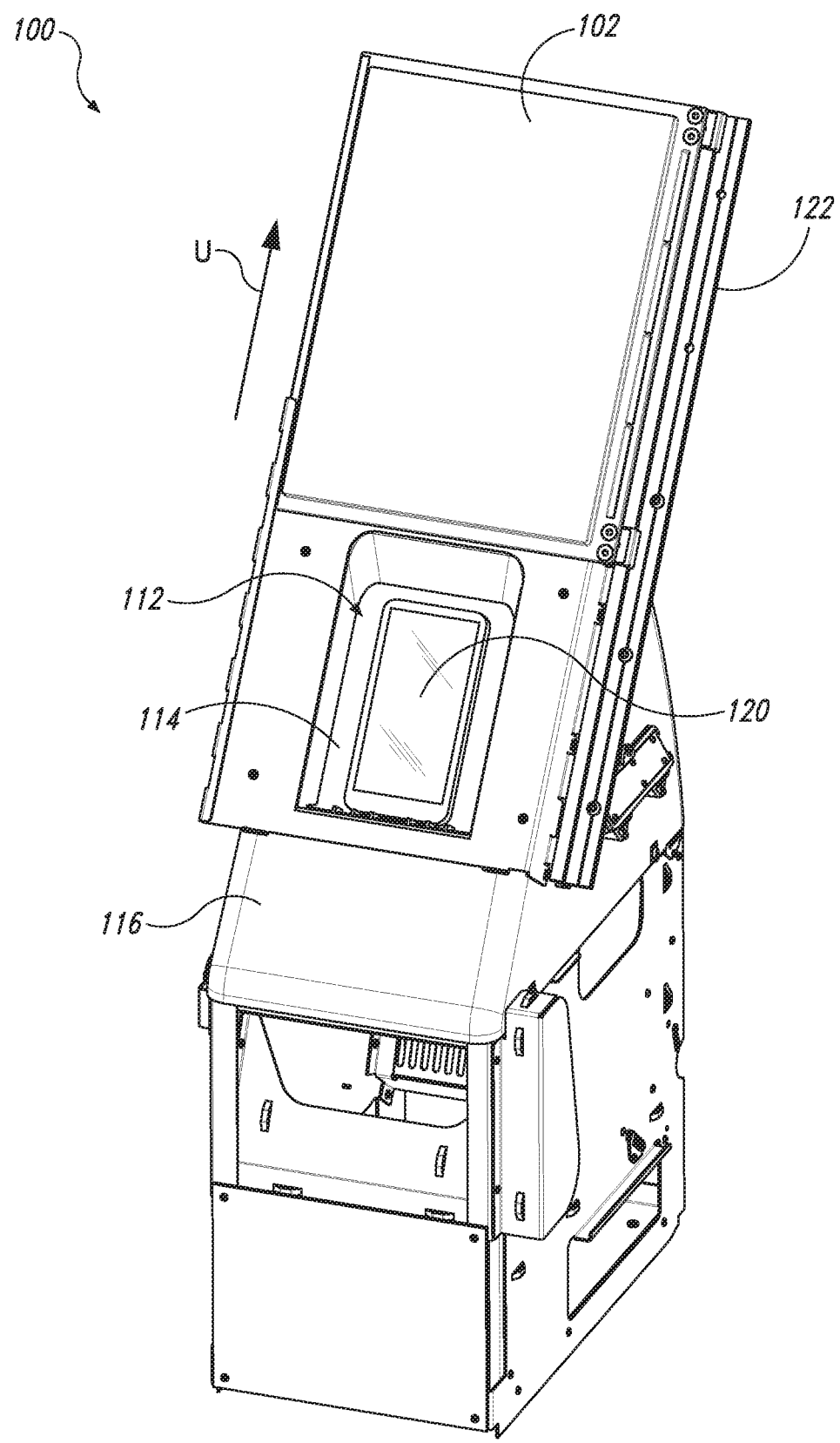
FIG. 1C is an enlarged front isometric view of selected internal components and systems of the kiosk.
Figure 1D:
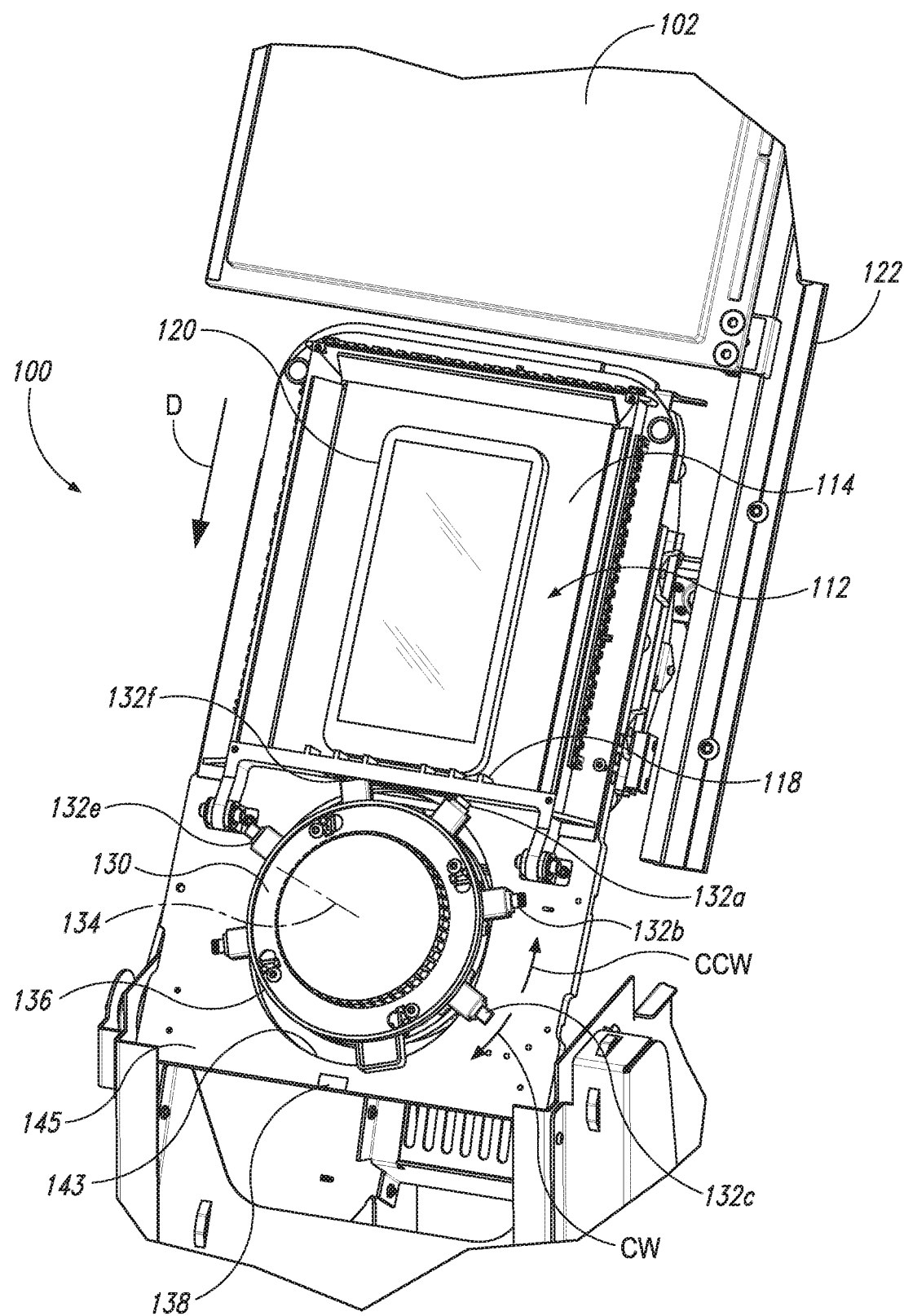
FIG. 1D is a further enlarged isometric view of a connector carrier and associated components of the kiosk configured in accordance with embodiments of the present technology.

FIG. 1C is an enlarged front isometric view of the kiosk 100 with the housing 106 removed to better illustrate selected internal components of the kiosk 100 associated with device evaluation. FIG. 1D is a further enlarged isometric view of the kiosk portion shown in FIG. 1C with a cover 116 removed to expose a connector carrier 130 configured in accordance with embodiments of the present technology. In both of these views, the access door 102 has been slid upwardly on the track 122 in direction U to expose the inspection area 112. As shown in FIG. 1D, the connector carrier 130 can be rotatably mounted in an opening 143 in a support plate 145 positioned below the inspection area 112 and under the cover 116 (FIG. 1C). In the illustrated embodiment, the connector carrier 130 has the form of a cylindrical carousel (which can also be referred to as a cylindrical hub) having a plurality of mobile phone electrical connectors 132a-f radially disposed around a periphery of a chassis 136. The individual connectors 132a-f can be selected so that all, or at least most, of the commercially available mobile phones can be connected to the carrier 130. For example, in some embodiments the connectors 132a-f can include Mini-USB, Micro-USB, Type-C and/or Lightning connectors.

In some embodiments, the process for selling a mobile phone via the kiosk 100 can be at least generally similar to one or more of the processes described in the patents and patent applications incorporated herein by reference. For example, referring to FIGS. 1A-1D together, a user wishing to sell a mobile phone 120 (FIGS. 1C and 1D) can approach the kiosk 100 and input various mobile phone and/or personal information via one or more of the user interface devices described above. Such information can include, for example, phone identification information (e.g., make and/or model), user identification information (e.g., a driver's license and/or a thumb print), etc.

Based on the phone make and/or model information as provided by the user, the connector carrier 130 rotates in a clockwise direction CW and/or a counterclockwise direction CCW about a central axis 134 as shown in FIG. 1D to selectively position a corresponding one of the connectors 132a-f directly adjacent to an opening (not shown in FIG. 1D) in a device shelf 118 (the shelf 118 can also be referred to as an edge member, guide, wall, etc.). As described in greater detail below, the connector carrier 130 then moves upwardly as a unit to insert the selected connector 132 through the opening so that it protrudes slightly above the shelf 118 and into the inspection area 112. The access door 102 then moves upwardly in direction U on the track 122 to expose a transparent plate 114 in the inspection area 112. In the illustrated embodiment, the transparent plate 114 is perpendicular to the central axis 134 and inclined relative to the horizontal plane at an angle of, for example, from about 45 degrees to about 75 degrees, from about 55 degrees to about 65 degrees, or about 60 degrees. In other embodiments, the transparent plate 114 can be positioned at other angles relative to the horizontal plane, or the transparent plate 114 can be parallel to the horizontal plane. After the door 102 opens, the user docks or otherwise connects the mobile phone 120 to the selected connector 132 by positioning the connector port in the mobile phone 120 directly over the connector 132 and moving the phone 120 downwardly in direction D to insert the connector 132 into the port. With the electrical connection thus made and the phone 120 positioned face-up on the transparent plate 114 as shown in FIG. 1D, the door 102 moves downwardly on the track 122 in direction D to the position shown in FIGS. 1A and 1B to close off the inspection area 112 and initiate the phone evaluation process. In some embodiments, the structures and functions of the kiosk 100 can be at least generally similar to the kiosk structures and functions described in U.S. Provisional Patent Application No. 62/807,153, titled KIOSK FOR EVALUATING AND PURCHASING USED ELECTRONIC DEVICES, which was filed on Feb. 18, 2019, and is incorporated herein by reference in its entirety.

In some embodiments, the kiosk 100 and various features thereof can be at least generally similar in structure and function to the systems, methods and corresponding features described in the following patents and patent applications, each of which is incorporated herein by reference in its entirety: U.S. Pat. Nos. 10,496,963; 10,475,002; 10,445, 708; 10,438,174; 10,417,615; 10,401,411; 10,269,110; 10,157,427; 10,127,647; 10,055,798; 10,032,140; 9,911, 102; 9,904,911; 9,885,672; 9,881,284; 9,818,160; 8,463, 646; 8,423,404; 8,239,262; 8,200,533; 8,195,511; and 7,881, 965; U.S. patent application Ser. Nos. 12/573,089; 12/727, 624; 13/113,497; 12/785,465; 13/017,560; 13/438,924; 13/753,539; 13/658,825; 13/733,984; 13/705,252; 13/487, 299; 13/492,835; 13/562,292; 13/658,828; 13/693,032; 13/792,030; 13/794,814; 13/794,816; 13/862,395; 13/913, 408; 14/498,763; 14/500,739; 14/873,158; 14/506,449; 14/925,357; 14/925,375; 14/934,134; 14/964,963; 14/568, 051; 14/966,346; 14/598,469; 14/660,768; 14/663,331; 15/057,707; 15/091,487; 15/214,791; 15/630,460; 15/641, 145; 15/672,157; 15/855,320; 15/901,526; 15/977,729; 16/195,785; 16/357,041; 16/534,741; 16/556,018; 16/556, 104; 16/575,003; 16/575,090; 16/601,492, and 16/719,699; U.S. Provisional Application No. 62/169,072, titled "METHODS AND SYSTEMS FOR VISUALLY EVALUATING ELECTRONIC DEVICES," filed by the applicant on Jun. 1, 2015; U.S. Provisional Application No. 62/202, 330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; U.S. Provisional Application No. 62/332,736, titled "METHODS AND SYSTEMS FOR DETECTING DAMAGE IN EDGE REGIONS OF MOBILE ELECTRONIC DEVICES," filed by the applicant on May 6, 2016; U.S. Provisional Application No. 62/782,302, titled "SYSTEMS AND METHODS FOR VENDING AND/OR PURCHASING MOBILE PHONES AND OTHER ELECTRONIC DEVICES," filed by the applicant on Dec. 19, 2019; U.S. Provisional Application No. 62/782,947, titled "SYSTEMS AND METHODS FOR VENDING AND/OR PURCHASING MOBILE PHONES AND OTHER ELECTRONIC DEVICES," filed by the applicant on Dec. 20, 2019; U.S. Provisional Application No. 62/804,714, titled "CONNECTOR CARRIER FOR ELECTRONIC DEVICE KIOSK," filed by the applicant on Feb. 12, 2019; U.S. Provisional Application No. 62/807,153, titled "KIOSK FOR EVALUATING AND PURCHASING USED ELECTRONIC DEVICES," filed by the applicant on Feb. 18, 2019, U.S. Provisional Application No. 62/807,165, titled "NEURAL NETWORK BASED PHYSICAL CONDITION EVALUATION OF ELECTRONIC DEVICES, AND ASSOCIATED SYSTEMS AND METHODS," filed by the applicant on Feb. 18, 2019, and U.S. Provisional Application No. 62/950,075, titled "SYSTEMS AND METHODS FOR VENDING AND/OR PURCHASING MOBILE PHONES AND OTHER ELECTRONIC DEVICES," filed by the applicant on Dec. 18, 2019. All the patents and patent applications listed in the preceding sentence and any other patents or patent applications identified herein are incorporated herein by reference in their entireties. Although the connector carrier 130 and embodiments thereof are described herein in the context of the kiosk 100, it should be understood that, unless the context requires otherwise, the connector carrier 130 is not limited to use with such kiosks. Accordingly, it is contemplated that the connector carrier 130 and various embodiments thereof can also be used with other types of kiosks and/or machines for mobile phone evaluation/recycling/purchasing/processing and/or other purposes.

Figure 2A:
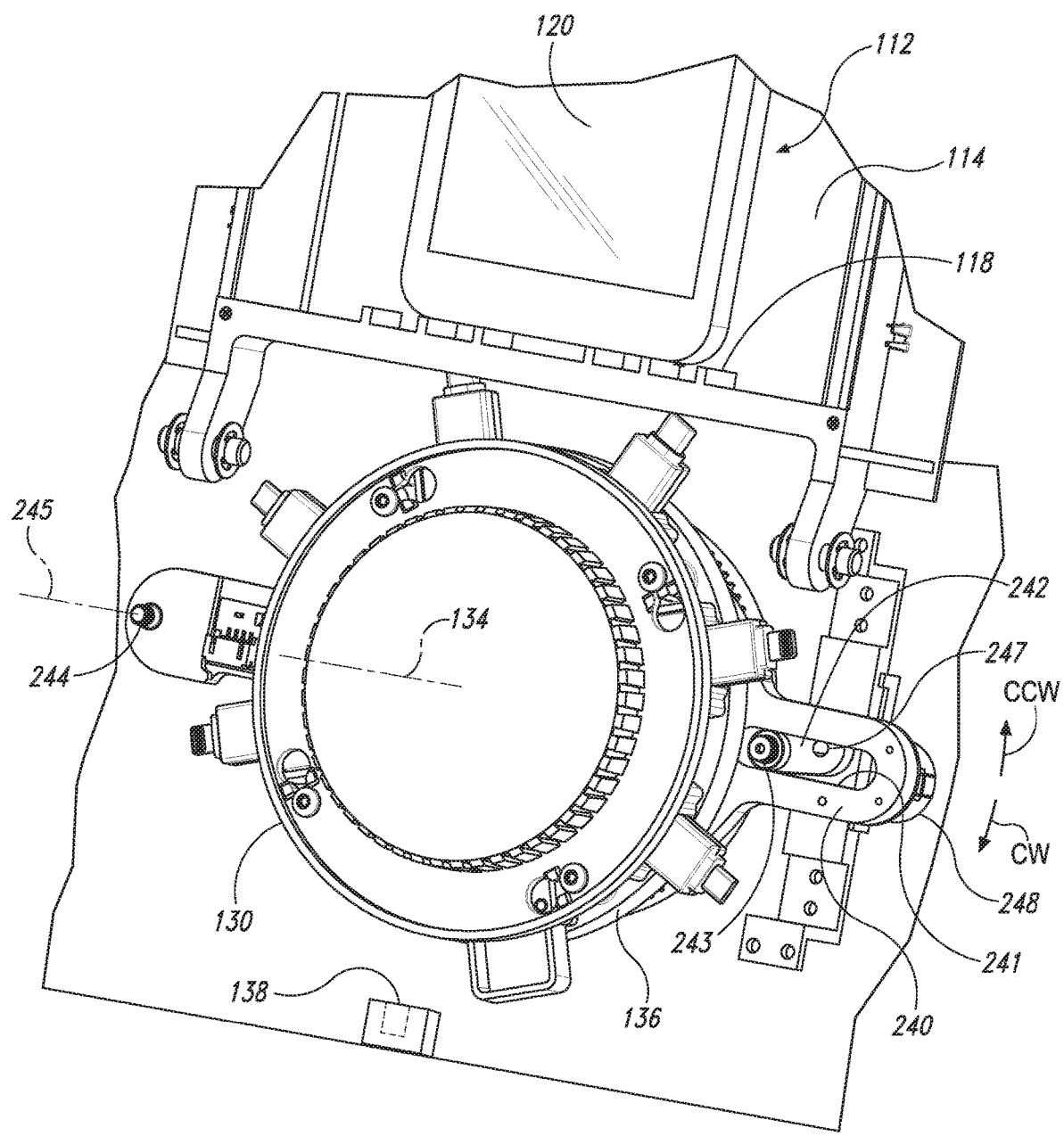
FIG. 2A is an enlarged front isometric view of the connector carrier and associated components from FIG. 1D.
Figure 2B:
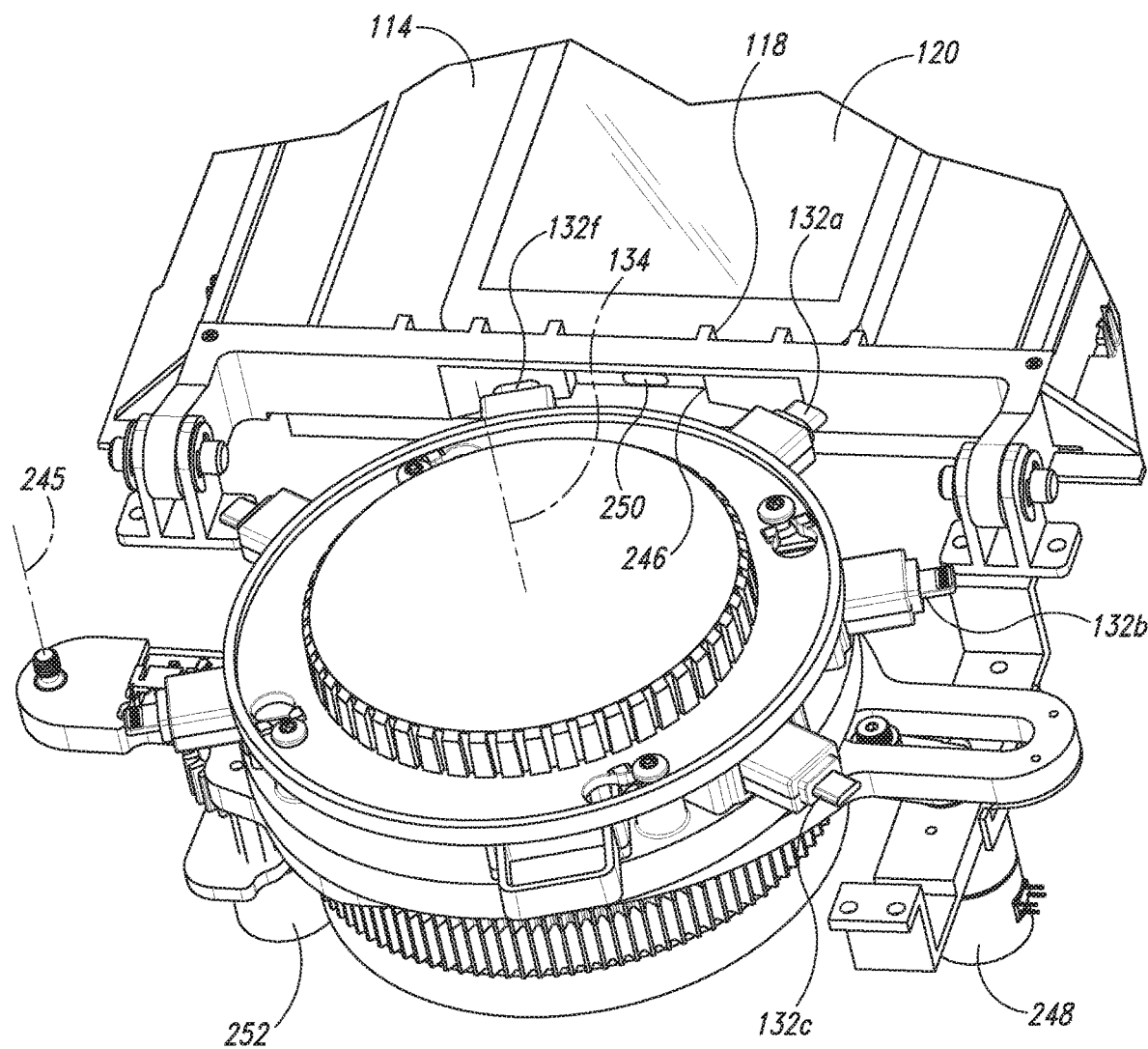
FIG. 2B is a bottom front isometric view of the connector carrier and the associated components.
Figure 2C:
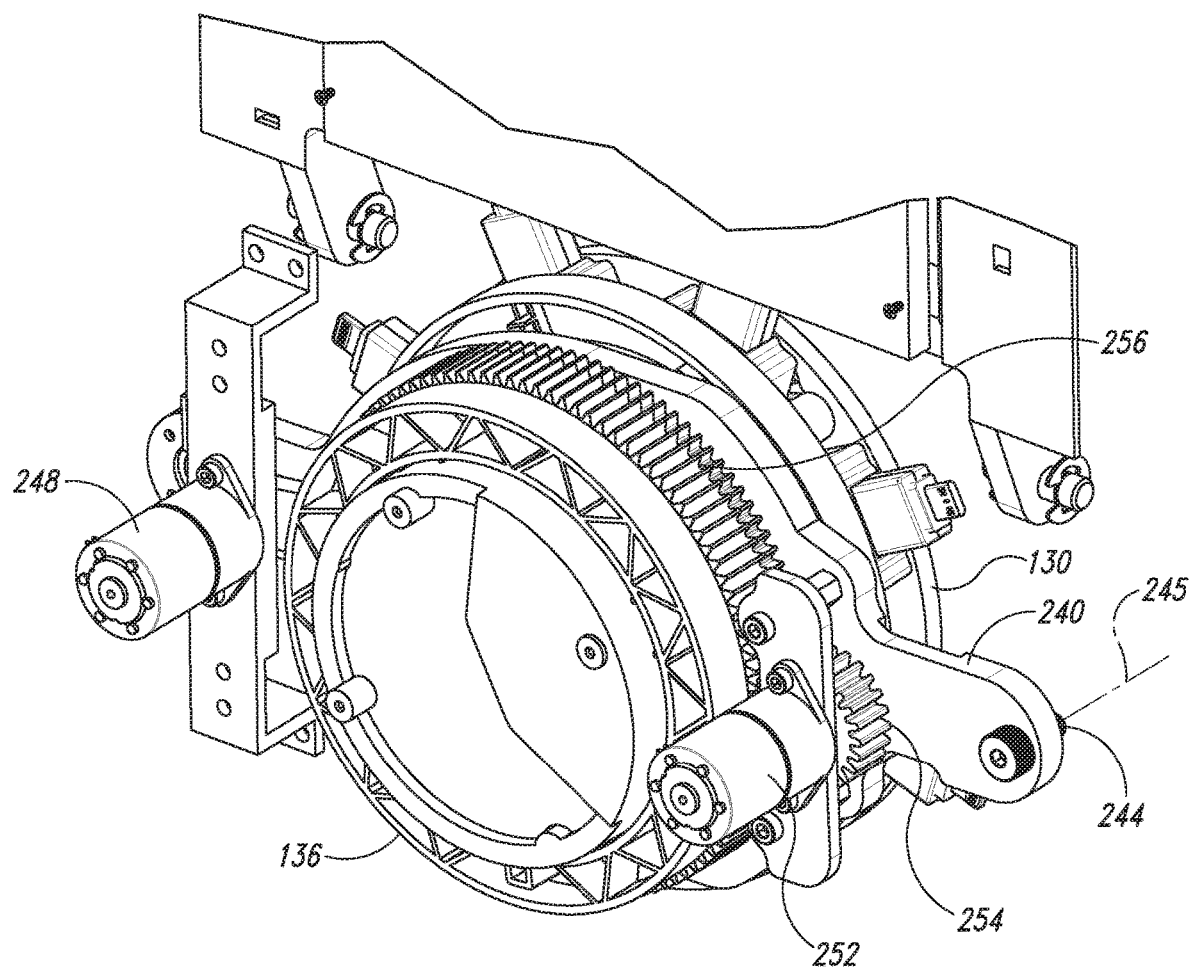
FIG. 2C is a rear isometric view of the connector carrier and the associated components.

FIG. 2A is an enlarged front isometric view of the connector carrier 130 and associated components configured in accordance with embodiments of the present technology. FIG. 2B is a bottom front isometric view of the connector carrier 130 and the associated components, and FIG. 2C is a rear isometric view of the connector carrier 130 and the associated components. In FIGS. 2A-2C, the support plate 145 (FIG. 1D) has been omitted for clarity of illustration. Referring to FIGS. 2A-2C together, the connector carrier 130 is rotatably mounted to a support frame 240 (which can also be referred to as a yoke 240). The support frame 240 is pivotally mounted to a back side of the support plate 145 (FIG. 1D) by a pivot pin 244 at a first end portion of the frame 240. An opposite end portion of the frame 240 includes a slot 241 that slidably receives a guide pin 243. In the illustrated embodiment, the slot 241 is generally orientated along a horizontal axis. The guide pin 243 is attached to a distal end portion of an eccentric crank arm 242, which in turn has a proximal end portion fixedly attached to a rotating shaft 247 extending from an electric motor 248. The electric motor 248 can be mounted to the back side of the support plate 145 (FIG. 1D) by a suitable bracket. As shown in FIG. 2C, the connector carrier chassis 136 includes a plurality of teeth 256 around the periphery thereof. The teeth 256 engage corresponding teeth on a pinion 254 (which can also be referred to as a spur gear 254), which is in turn attached to a drive shaft of an electric motor 252. The electric motor 252 is mounted to a back side of the support frame 240 by a suitable bracket.

Referring next to FIG. 2B, in some embodiments the kiosk 100 can identify the appropriate connector 132 for connecting to the mobile phone 120 based on the make and/or model of the phone 120 as indicated by the user (via, e.g., the kiosk display 104; FIG. 1A). In operation, the electric motor 252 (under control of, e.g., the kiosk processor 140) is activated to rotate the pinion 254, which through engagement with the teeth 256 rotates the connector carrier 130 about the central axis 134 to position the appropriate connector 132 in the 12 o'clock position directly adjacent to and aligned with an opening 246 in the shelf 118. In some embodiments, the electric motor 252 can rotate the connector carrier 130 up to 180 degrees in either the clockwise direction CW or the counterclockwise direction CCW about the central axis 134 to position a selected connector 132 adjacent to the opening 246. In other embodiments, the electric motor 252 can rotate the connector carrier 130 more or less than 180 degrees in either direction about the central axis 134 for connector positioning, such as a full 360 degrees in either direction. Before the connector carrier 130 rotates about the axis 134 in this manner, the crank arm 242 positions the guide pin 243 in the position shown in FIG. 2A (e.g., the 9 o'clock position) or at a lower position (e.g., a lower position between the 9 o'clock position and the 3 o'clock position, such as the 6 o'clock position). Moving the guide pin 243 to a lower position in this manner rotates the support frame 240 downwardly about the axis 245 in the CW direction and away from the shelf 118. This enables the connectors 132a-f to rotate about the axis 134 without striking the underside of the shelf 118 on either side of the opening 246.

Figure 2D:
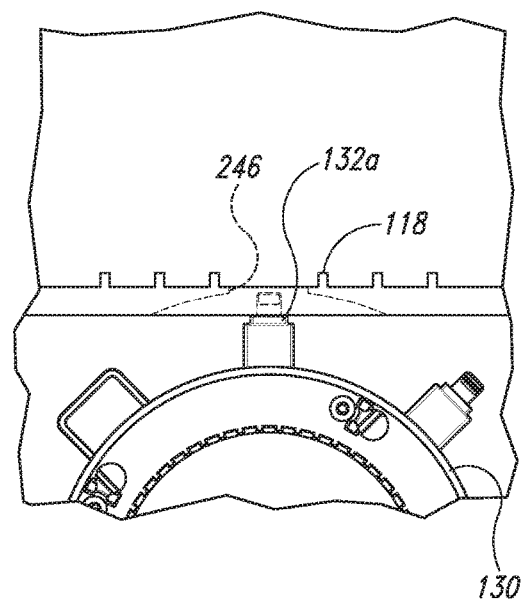
FIG. 2D is a front view of the connector carrier with a selected connector in a first position.
Figure 2E:
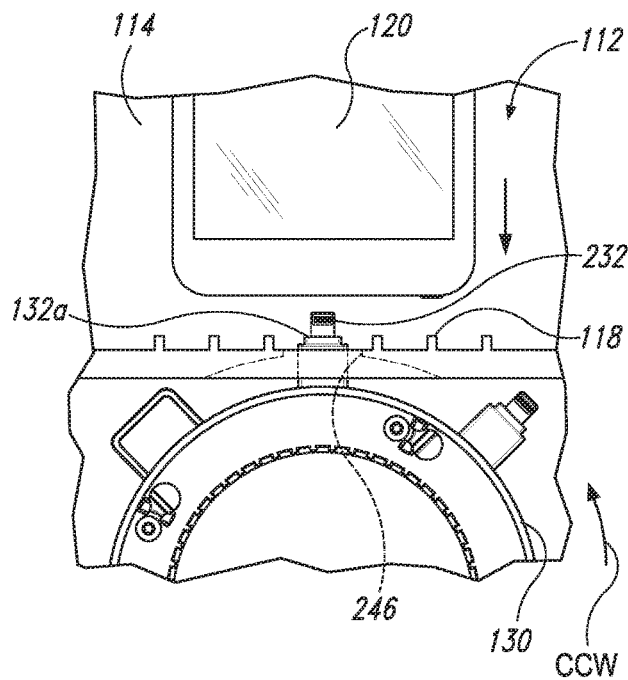
FIG. 2E is a similar front view of the connector carrier with the selected connector in a second position for connection to a mobile phone.

FIG. 2D is a front view of the connector carrier 130 with a selected connector (e.g., the connector 132a) aligned with the opening 246 in the shelf 118 (FIG. 2B) but not extending through the opening 246, and FIG. 2E is a similar front view with the connector 132a inserted through the opening 246 for connection to the mobile phone 120. Referring to FIGS. 2D and 2E together, once the correct connector 132a is positioned directly adjacent to the opening 246 and generally aligned with the opening 246 as shown in FIG. 2D (in what can be referred to as, e.g., a "first connector position" or a "staging position"), the motor 252 stops rotation of the connector carrier 130, and the motor 248 rotates the crank arm 242 in, e.g., the clockwise direction CW to position the guide pin 243 (FIG. 2B) at or near the 12 o'clock position. Moving the guide pin 243 in this manner causes the connector support 240 to rotate in the counterclockwise direction CCW about an axis 245 of the pivot pin 244 (FIG. 2B), thereby moving the connector carrier 130 toward the inspection area 112 and inserting the selected connector 132a through the opening 246 so that at least a portion of the connector 132a (e.g., a tip portion 232) protrudes beyond the shelf 118 and into the inspection area 112 as shown in FIG. 2E. As described above, when the selected connector 132a is in this position (which can be referred to as, e.g., a "second connector position" or an "engagement position") the user can manually dock or otherwise connect the mobile phone 120 to the connector carrier 130 by moving the phone 120 downwardly on the transparent plate 114 to insert the selected connector 132a (e.g., the tip portion 232 of the selected connector 132a) into a connector port 250 on the phone 120 (FIG. 2B).

Once the mobile phone 120 has been correctly connected to the appropriate connector 132 in the foregoing manner, the access door 102 on the kiosk 100 (FIGS. 1A and 1B) slides downwardly on the track 122 to close off the inspection area 112 to the user. The kiosk 100 can then perform an electrical inspection of the mobile phone 120 (for, e.g., device identification (e.g., IMEI number, etc.), battery capacity, functionality, etc.) and/or a visual analysis of the mobile phone 120 (for, e.g., cracks in the display screen, cosmetic condition, etc.). In some embodiments, the electrical and/or visual inspections performed by the kiosk 100 can be at least generally similar to the electrical and visual inspections described in one or more of the patents and patent applications incorporated herein by reference. Once these inspections are complete, the kiosk 100 can automatically activate the motor 248 to rotate the crank arm 242 and the corresponding guide pin 243 downwardly from the 12 o'clock position. As the guide pin 243 moves downwardly in this manner, it drives the carrier support frame 240 downwardly in the clockwise direction CW about the pivot pin 244, which in turn causes the connector carrier 130 to move downwardly and away from the inspection area 112. This movement of the connector carrier 130 retracts the selected connector 132 back through the opening 246 to automatically disconnect the connector 132 from the mobile phone 120. If the user wishes to accept an offered price and sell the phone to the kiosk 100, the transparent plate 114 can be rotated back and downwardly to cause the phone 120 to slide out of the inspection area 112 and into a collection bin (not shown). Conversely, if the user declines to sell the phone for the offered price, the access door 102 (FIGS. 1A and 1B) can move upwardly on the guide track 122 to enable the user to reach into the inspection area 112 and retrieve the mobile phone 120.

In some embodiments, the kiosk 100 can periodically perform a self-test of the connectors 132a-f to ensure that all the connectors are functional and to identify any non-functional connectors that may need replacement. For example, as shown in FIG. 2A, in some embodiments the kiosk 100 can include an electrical test port 138 (mounted to, e.g., a front side of the support plate 145; FIG. 1D). The test port 138 can be a female port or socket configured to receive one or more of the connectors 132a-f and electrically test the functionality of the connectors. For example, to perform a self-test of a selected connector 132, the motor 252 (FIG. 2C) can rotate the carrier 130 about the central axis 134 as needed to position the selected connector 132 in radial alignment with the test port 138. The motor 248 then rotates the crank arm 242 and the guide pin 243 downwardly toward the 6 o'clock position to thereby rotate the carrier support frame 240 downwardly in the CW direction about the pivot pin 244, which in turn drives the selected connector 132 into the test port 138. Once the test is complete, the motor 248 rotates the crank arm 242 and the guide pin 243 upwardly to thereby rotate the carrier support frame 240 upwardly about the pivot pin 244 in the CCW direction and disconnect the selected connector 132 from the test port 138. If needed, the kiosk 100 can include multiple test ports 138 as necessary to accommodate different types of the connectors 132. The test port(s) 138 can be connected to suitable kiosk software and/or electrical systems to test the individual connectors 132a-f for continuity, impedance, etc. and ensure proper function. If any of the connectors 132 are found to be not functioning correctly, the kiosk 100 can send a corresponding text or other electronic message to service personnel to alert them about the faulty connector so that it can be promptly replaced.

Figure 3A:
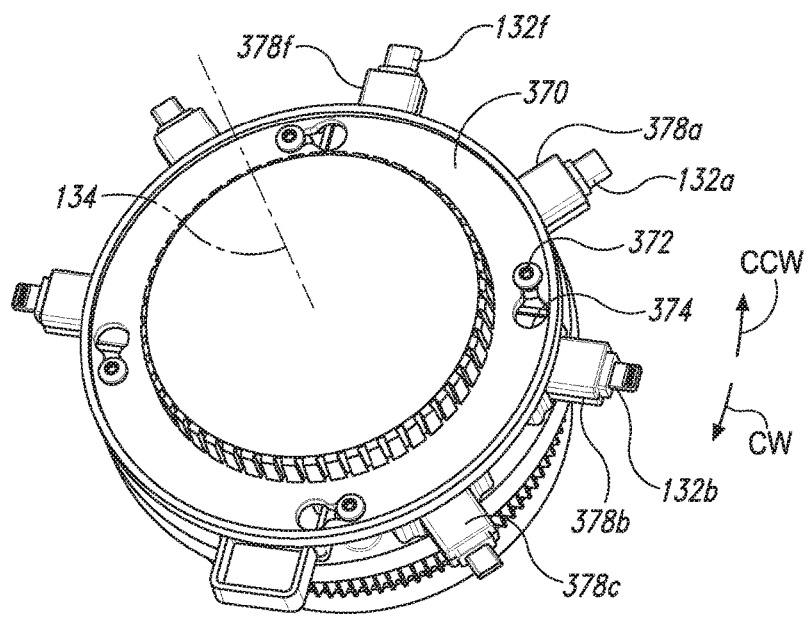
FIG. 3A is a front isometric view of the connector carrier of FIGS. 1D-2C.
Figure 3B:
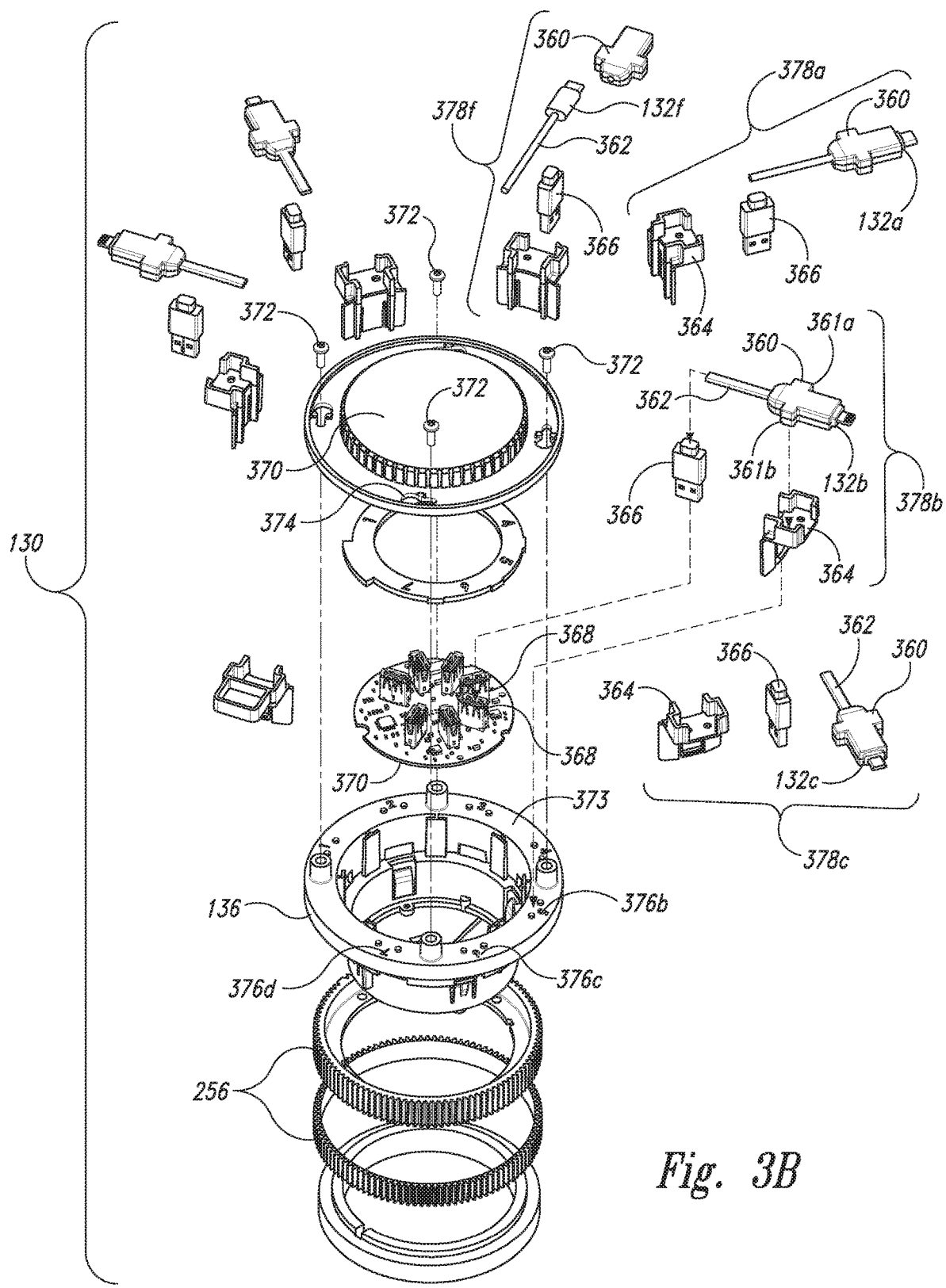
FIG. 3B is an exploded front isometric view of the connector carrier configured in accordance with embodiments of the present technology.

FIG. 3A is an enlarged front isometric view of the connector carrier 130, and FIG. 3B is an exploded isometric view of the connector carrier 130 configured in accordance with embodiments of the present technology. Referring to FIGS. 3A and 3B together, in the illustrated embodiment the connector carrier 130 includes a plurality of connector cable assemblies 378a-f positioned beneath a top cover 370. The cover 370 is releasably secured to the carrier chassis 136 by a plurality of fasteners 372 (e.g., screws) that extend through slotted end portions of openings 374 in the cover 370. To remove the cover 370 and access the connector cable assemblies 378, a user can loosen the fasteners 372 and rotate the cover 370 in the counterclockwise direction CCW to align the faster heads with the over-sized end portion of the openings 374. The cover 370 can then be lifted clear of the fasteners 372 and off the chassis 136.

As shown in FIG. 3B, each of the connector cable assemblies 378a-f includes one of the mobile phone connectors 132, a connector holder 360, an electrical cable 362, and a chassis connector 366 (e.g., a universal cable connector, such as a USB connector). Each of the electrical cables 362 has a first end portion electrically connected to a corresponding one of the phone connectors 132 and a second end portion electrically connected to a corresponding one of the chassis connectors 366. To hold (e.g., fixedly hold) the phone connectors 132 in their proper positions relative to the chassis 136, each connector 132 is received in a corresponding connector holder 360, which in turn is held in a corresponding bracket 364 that is fixedly attached to an annular flange 373 of the chassis 136. The connector holders 360 can include asymmetric protrusions 361a, b on either side thereof (such as the rectangular protrusions shown in FIG. 3B) and/or other dimensional features to ensure that the holders 360 are positioned in the corresponding brackets 364 in the correct orientation (e.g., with the tip of the connector 132 pointing radially outward). Each of the chassis connectors 366 is operably received in a corresponding connector socket 368 which is fixedly arranged on a carrier plate 370.

As noted above, some electronic device recycling kiosks include connectors and associated electrical cables that are configured to be pulled away from a connector carrier by a user and manually connected to a device the user wishes to sell. As a result, the electrical cables are subjected to stress and strain from manual use that can result in damage over time, thereby requiring replacement and/or repair. In contrast, the connector carrier 130 does not rely on the user to grasp the selected connector 132 and manually withdraw it from the carrier and connect it to their mobile device. To the contrary, with reference to FIG. 2B, the user simply docks or otherwise connects the mobile device 120 to the presented connector 132 by aligning the mobile device connector port (e.g., the connector port 250) with the connector 132 and sliding the mobile device 120 downwardly to insert the connector into the connector port. Similarly, the mobile device 120 can be automatically disconnected from the presented connector 132 by movement of the connector carrier 130 downwardly about the pivot pin 244 in the clockwise direction CW as shown in FIG. 2A. As a result of these features, the connectors 132 and associated electrical cables 362 (FIG. 3B) described herein are not subjected to manual use that can lead to damage and the need for frequent and costly replacement or maintenance.

In addition to the foregoing features, in some embodiments the connector carrier 130 can include a plurality of visual indicators to assist service personnel in identifying broken or malfunctioning cable assemblies 378 in the event that they may need replacement. For example, as shown in FIG. 3B, in some embodiments the connector carrier 130 can include a plurality of visual indicators 376a-f (e.g., light-emitting diodes (LEDs)) positioned on the flange 373 of the chassis 136 proximate to corresponding ones of the connectors 132a-f. If a particular cable assembly 378 is determined to need replacement (as a result of, e.g., a connector self-test as described above), the associated indicator 376 can be illuminated to signal the service personnel as to which of the cable assemblies 378 should be replaced. In other embodiments, each of the cable assemblies 378 and/or selected portions thereof can have a unique color, and when the service personnel receives an alert indicating that one of the cable assemblies 378 needs to be replaced, the alert can identify the color of the particular cable assembly 378 so that the service personnel can quickly identify it during the service call. In further embodiments, other types of cable assembly identification can be used, such as identifying each cable assembly 378 with a selected number that is printed or otherwise provided adjacent each cable location.

Aspects of the invention can be embodied in a special purpose computer or data processor that is specifically programmed, configured, or constructed to perform one or more of the computer-executable instructions described in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Although specific circuitry is described above, those or ordinary skill in the art will recognize that a microprocessor-based system could also be used where any logical decisions are configured in software.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A kiosk for purchasing mobile phones from users, the kiosk comprising:
   an inspection area configured to receive a mobile phone from a user; and
   a connector carrier, wherein the connector carrier includes—
      a chassis; and
      a plurality of electrical connectors positioned around a periphery of the chassis, wherein the connector carrier is configured to rotate about a central axis to position a selected one of the electrical connectors in a first position adjacent to the inspection area, and wherein the connector carrier is further configured to move toward the inspection area when the selected electrical connector is in the first position to move the selected electrical connector from the first position to a second position in which the selected electrical connector is positioned for connection to the mobile phone in the inspection area.

2. The kiosk of claim 1 wherein each of the electrical connectors is fixedly attached to the chassis of the connector carrier.

3. The kiosk of claim 1 wherein moving the selected electrical connector from the first position to the second position includes moving at least a tip portion of the selected electrical connector into the inspection area.

4. The kiosk of claim 1 wherein movement of the connector carrier toward the inspection area includes movement of the connector carrier in a first direction, and wherein the connector carrier is further configured to move in a second direction, opposite to the first direction, to move the selected electrical connector from the second position to the first position and automatically disconnect the selected electrical connector from the mobile phone.

5. The kiosk of claim 1 wherein the central axis is a first axis, and wherein movement of the connector carrier toward the inspection area includes rotation of the connector carrier about a second axis, spaced apart from the first axis.

6. The kiosk of claim 5 wherein movement of the connector carrier toward the inspection area includes rotation of the connector carrier about the second axis in a first direction, and wherein the connector carrier is further configured to rotate about the second axis in a second direction, opposite to the first direction, to move the selected electrical connector from the second position to the first position and automatically disconnect the one electrical connector from the mobile phone.

7. The kiosk of claim 1 wherein the central axis is a first axis, and wherein the kiosk further comprises:
   a support frame configured to rotated about a second axis, spaced apart from the first axis, wherein:
      the connector carrier is rotatably mounted to the support frame,
      movement of the connector carrier toward the inspection area includes rotation of the support frame about the second axis in a first direction, and
      the support frame is further configured to rotate about the second axis in a second direction, opposite to the first direction, to move the selected electrical connector from the second position to the first position and automatically disconnect the one electrical connector from the mobile phone.

8. The kiosk of claim 1 wherein the mobile phone includes a front surface, a back surface, and at least one side surface having a connector receptacle, and wherein the kiosk further includes:
   a support surface positioned in the inspection area and configured to contact at least one of the front surface or the back surface of the mobile phone; and
   a shelf having an opening positioned adjacent to the support surface, wherein the shelf is configured to contact the at least one side surface of the mobile phone having the connector receptacle, and wherein the opening is configured to receive at least a portion of the selected electrical connector as the selected electrical connector moves into the second position.

9. The kiosk of claim 8 wherein the support surface is inclined at an angle relative to a horizontal plane.

10. The kiosk of claim 8 wherein the central axis extends perpendicular to the support surface.

11. The kiosk of claim 8, further comprising a transparent plate positioned in the inspection area, wherein the transparent plate includes the support surface.

12. The kiosk of claim 1 wherein the connector carrier has a cylindrical shape.

13. A connector carrier for use with a kiosk configured to purchase mobile phones from users, the connector carrier comprising:
- a support frame configured to be movably mounted proximate a phone inspection area of the kiosk;
- a carrier chassis rotatably supported by the support frame; and
- a plurality of mobile phone electrical connectors fixedly positioned on the chassis and extending outwardly therefrom, wherein the chassis is configured to rotate about a central axis in the support frame to selectively position the electrical connectors relative to the inspection area, and wherein the support frame is configured to move the chassis relative to the inspection area.

14. The connector carrier of claim 13 wherein the support frame is configured to move the chassis through an arc relative to the inspection area.

15. The connector carrier of claim 14 wherein the arc lies in a plane that is perpendicular to the central axis of the carrousel chassis.

16. The connector carrier of claim 13 wherein the support frame is configured to be pivotally mounted to a support structure of the kiosk at a pivot point spaced apart from the central axis of the chassis, and wherein the support frame is further configured to rotate about the pivot point to move the chassis relative to the inspection area.

17. The connector carrier of claim 13 wherein the inspection area of the kiosk includes a transparent plate configured to support mobile phones, and wherein the chassis is configured to rotate about the central axis in a plane that is parallel to the transparent plate.

18. A method for presenting a selected electrical connector of a plurality of different electrical connectors to a user of a kiosk for connection to a mobile phone, the method comprising:
- rotating a connector carrousel about a central axis, wherein the connector carrousel carries the plurality of different electrical connectors around a periphery thereof;
- stopping the rotating carrousel when the selected electrical connector is positioned adjacent to a mobile phone inspection area of the kiosk; and
- after stopping rotation of the carrousel, moving the carrousel toward the inspection area to present the selected electrical connector to the user for connection to the mobile phone.

19. The method of claim 18 wherein moving the carrousel toward the inspection area includes rotating the carrousel about a pivot axis spaced apart from the central axis.

20. The method of claim 18 further comprising, after moving the carrousel toward the inspection area to present the selected electrical connector to the user for connection to the mobile phone, moving the carrousel away from the inspection area to automatically disconnect the selected electrical connector from the mobile phone.

* * * * *